United States Patent
Boldt et al.

(10) Patent No.: US 9,906,733 B2
(45) Date of Patent: Feb. 27, 2018

(54) HARDWARE AND SYSTEM FOR SINGLE-CAMERA STEREO RANGE DETERMINATION

(71) Applicant: The Johns Hopkins University, Baltimore, MD (US)

(72) Inventors: John D. Boldt, Catonsville, MD (US); Michael A. Kelly, Bristow, VA (US); Edward H. Darlington, Clarksville, MD (US); David M. DeTomaso, Berkeley, CA (US)

(73) Assignee: The Johns Hopkins University, Baltimore, MD (US)

( * ) Notice: Subject to any disclaimer, the term of this patent is extended or adjusted under 35 U.S.C. 154(b) by 185 days.

(21) Appl. No.: 14/745,779

(22) Filed: Jun. 22, 2015

(65) Prior Publication Data
US 2016/0370175 A1    Dec. 22, 2016

(51) Int. Cl.
| | |
|---|---|
| *G01B 11/14* | (2006.01) |
| *H04N 5/247* | (2006.01) |
| *G01C 3/08* | (2006.01) |
| *G01S 17/95* | (2006.01) |
| *G01S 11/12* | (2006.01) |

(52) U.S. Cl.
CPC .............. *H04N 5/247* (2013.01); *G01C 3/08* (2013.01); *G01S 11/12* (2013.01); *G01S 17/95* (2013.01)

(58) Field of Classification Search
CPC ................................ G01S 11/00; H04N 5/247
See application file for complete search history.

(56) References Cited

U.S. PATENT DOCUMENTS

| | | | | |
|---|---|---|---|---|
| 6,108,032 | A * | 8/2000 | Hoagland | G01C 11/02 250/330 |
| 8,111,289 | B2 * | 2/2012 | Zruya | G08B 13/19602 348/144 |
| 9,420,177 | B2 * | 8/2016 | Pettegrew | G06T 7/80 |
| 9,773,348 | B2 * | 9/2017 | Lin | G06T 19/003 |
| 2004/0056966 | A1 * | 3/2004 | Schechner | H04N 5/2254 348/229.1 |
| 2004/0073578 | A1 * | 4/2004 | Nam | G06F 17/30241 |
| 2007/0274714 | A1 * | 11/2007 | Achal | G01J 3/02 398/43 |
| 2009/0021598 | A1 * | 1/2009 | McLean | G01J 3/02 348/222.1 |
| 2010/0250057 | A1 * | 9/2010 | Steffler | G06F 11/1666 701/33.4 |
| 2011/0128347 | A1 * | 6/2011 | Theobald | H04N 5/2251 348/36 |

(Continued)

*Primary Examiner* — Neil Mikeska
(74) *Attorney, Agent, or Firm* — Sung T. Kim (57) ABSTRACT

A range determiner assembly may include an image sensor, a detector board and processing circuitry. The image sensor may be configured to obtain image data for each of three views of a target at each of a plurality of different locations along the track of a craft moving at a determinable altitude above a surface of the earth. The detector board may include a first line array, a second line array and a third line array. Each of the first, second and third line arrays may receive a respective sequence of images from a corresponding one of the three views. The processing circuitry may be configured to determine a relative distance between the craft and the target based on the image data.

20 Claims, 4 Drawing Sheets

(56) References Cited

U.S. PATENT DOCUMENTS

| | | | |
|---|---|---|---|
| 2012/0019708 A1* | 1/2012 | Morihisa | G02B 7/30 348/348 |
| 2015/0010200 A1* | 1/2015 | Kawahara | G01W 1/02 382/100 |
| 2015/0019185 A1* | 1/2015 | Cunningham | G06F 17/5009 703/6 |
| 2015/0103169 A1* | 4/2015 | Verret | G06T 5/003 348/147 |

* cited by examiner

HARDWARE AND SYSTEM FOR SINGLE-CAMERA STEREO RANGE DETERMINATION

STATEMENT REGARDING FEDERALLY SPONSORED RESEARCH OR DEVELOPMENT

This invention was made with Government support under contract number FA8803-13-C-0004 awarded by the United States Department of the Air Force. The Government has certain rights in the invention.

TECHNICAL FIELD

Exemplary embodiments of the present disclosure generally relate to range measurement technology, and more specifically relate to a system and corresponding hardware for providing stereo range determination using a single-camera.

BACKGROUND

The ability to measure range to a reflecting object by using the parallax effect has been used extensively in environmental sensing. However, current and previous generations of technology used to perform such range measurements generally rely upon multiple imagers and/or multiple satellites to achieve a diversity of views as required for such measurements. The cost and complexity of such systems has therefore been undesirably high. To address some of these drawbacks, solutions have been sought in the area of range measurement technology and prototypes have been built and flown to demonstrate new technologies.

BRIEF SUMMARY OF SOME EXAMPLES

Some example embodiments may enable the provision of a stereo range retrieval system that uses a single imager and a single detector board configured with three line arrays to collect images at different viewing angles via a single platform.

In one example embodiment, a range determiner assembly is provided. The range determiner assembly may include an image sensor, a detector board and processing circuitry. The image sensor may be configured to obtain image data for each of three views at a plurality of different locations along the track of a craft moving at a determinable altitude above a surface of the earth. The detector board may include a first line array, a second line array and a third line array. Each of the first, second and third line arrays may receive a respective sequence of images from a corresponding one of the three views. The processing circuitry may be configured to determine a relative distance between the craft and the target based on the image data.

In another example embodiment, a method of determining range to a target is provided. The method may include obtaining image data for each of three views at a plurality of different locations along a track of a craft moving at a determinable altitude above a surface of the earth. The method may further include providing the image data to a detector board comprising a first line array, a second line array and a third line array. Each of the first, second and third line arrays may receive a respective sequence of images from a corresponding one of the three views. The method may further include determining a relative distance between the craft and the target based on the image data.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
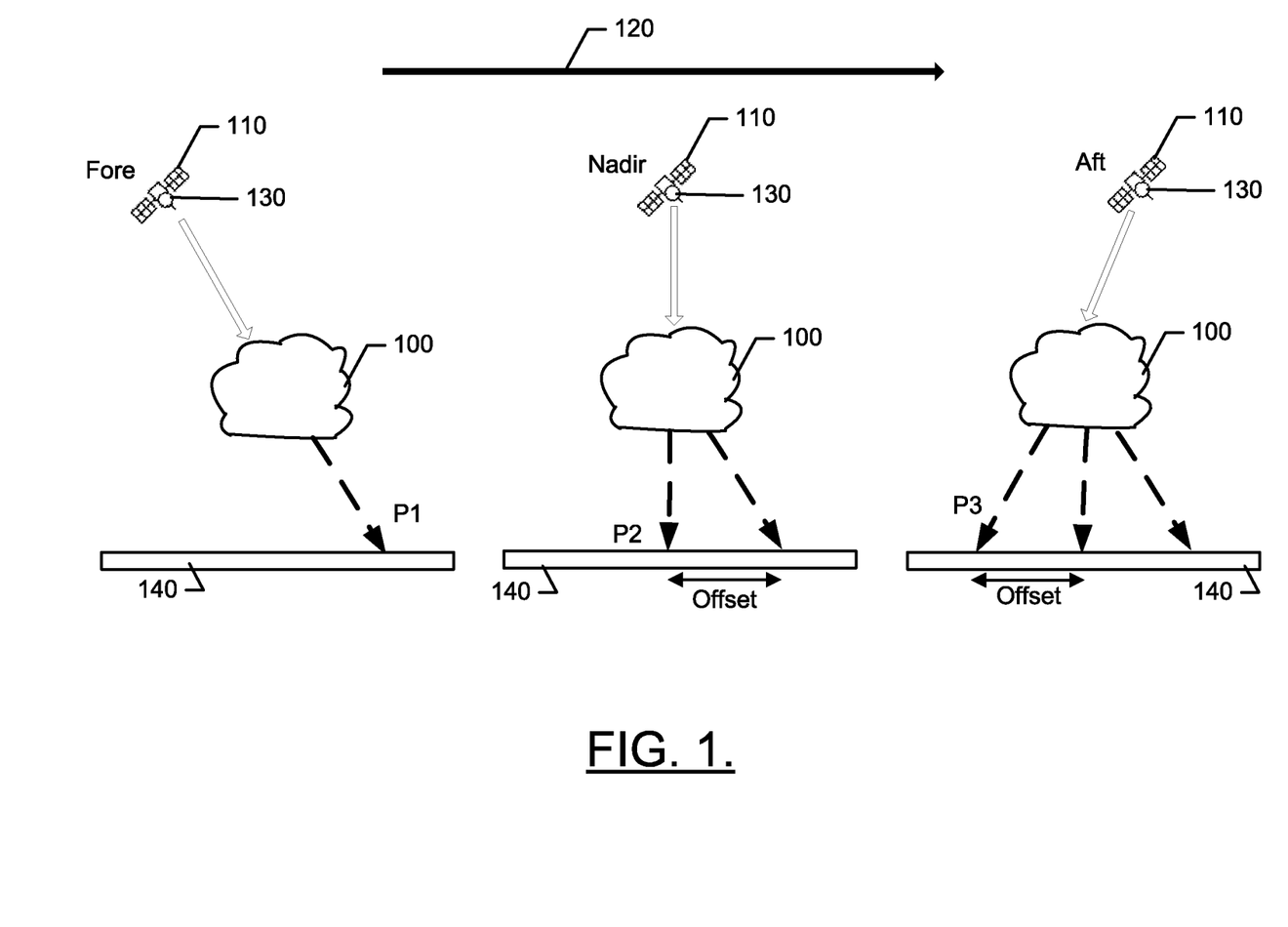
FIG. 1 illustrates a diagram showing a general process for estimating cloud-top height using stereo estimation in accordance with an example embodiment.

FIG. 1 illustrates a diagram showing a general process for estimating cloud-top height using stereo estimation. In this regard, FIG. 1 shows a series of scenes for three different perspective views of a cloud. As shown in FIG. 1, images of a target 100 (e.g., the cloud) may be captured at each of three locations of an aircraft 110 (e.g., an airplane, drone, satellite or other airborne asset). The image capturing may be accomplished based on movement of the aircraft 110 in a direction shown by arrow 120 such that a first view (e.g., a fore view) with a corresponding first apparent position P1, a second view (e.g., a nadir view) with a corresponding second apparent position P2, and a third view (e.g., a aft view) with a corresponding third apparent position P3 are all captured in sequence. The aircraft 110 may be fitted with a range determiner assembly 130 of an example embodiment; however, general operation of the system will first be described to facilitate further explanation of how the range determiner assembly 130 of an example embodiment may operate.

After obtaining the images at each of the first, second and third apparent positions (P1, P2 and P3), the images can be co-aligned so that stereo range retrieval (SRR) can be accomplished. SRR derives from processing co-aligned images taken from a vehicle in a traveling direction for lines of sight between the imaging system and an object of interest (e.g., the cloud in the example of FIG. 1). The co-alignment of the images allows the pixels to be registered onto a surface of known distance (e.g., the earth's surface 140) from the range determiner assembly 130. Due to the parallax effect, the apparent positions of the target 100 on the surface 140 become offset if the target 100 is a measurable distance above the surface 140. As the distance between the target 100 and the surface 140 increases, the offset between the fore, nadir and aft views also increases. Based on the distance between the aircraft 110 and the surface 140 (assuming it is known or knowable), and the height of the target 100, the pixel offset can be related to the distance between the target 100 and the surface 140. In this case, the distance between the target 100 and the surface 140 represents the cloud-top height.

In an example embodiment, the range determiner assembly 130 may provide a single hardware platform for capturing image data needed for the processes described above and for processing the image data with a corresponding line array for each respective view that is obtained. Thus, a single imager and corresponding single detector board configured with three line arrays for storing images at each of the different viewing angles can be provided to improve the efficiency and operability of the system. Moreover, in some cases, the range determiner assembly 130 could be provided as a modular device with different imaging technologies or capabilities being employed for corresponding different tasks. As such, for example, different cameras having corresponding different characteristics may be employed to achieve a desired level of accuracy and/or additional information for processing in some cases. As an example, an IR camera may be employed to enable the range determiner assembly 130 to provide a stereo visible-near infrared (SVNIR) system. Moreover, in some cases, multispectral capabilities may be employed to further aid in the detection and characterization of thin cloud and other difficult-to-detect targets.

Figure 2:
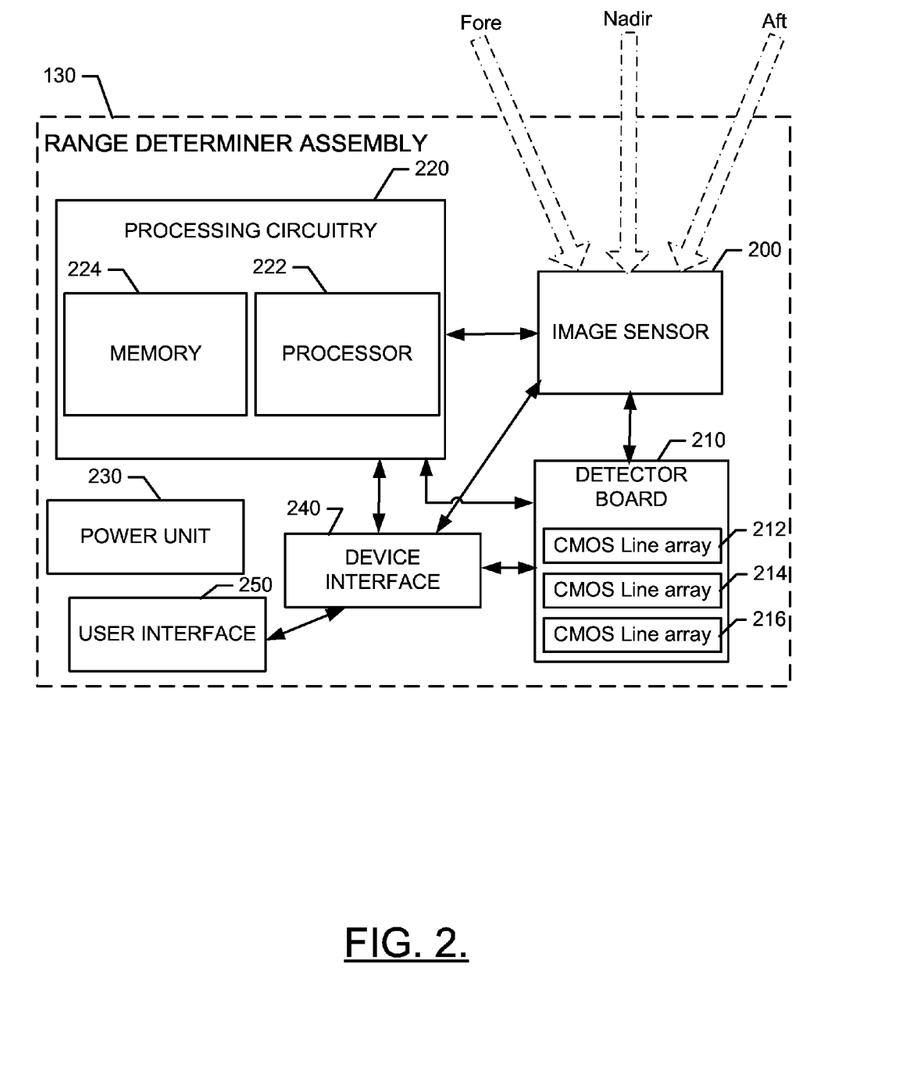
FIG. 2 illustrates a block diagram showing components of a range determination system in accordance with an example embodiment.

FIG. 2 illustrates a block diagram of the range determiner assembly 130 in accordance with an example embodiment. As shown in FIG. 2, the range determiner assembly 130 may be embodied as a computer/processor controlled device, or at least as a suite of devices interfacing with or under the control of a computer/processor. Thus, for example, the range determiner assembly 130 may include an imaging sensor 200, a detector board 210, processing circuitry 220 and a power unit 230. The power unit 230 may be embodied as a battery or battery pack. However, a power system or module of the aircraft 110 may serve as the power unit 230 in some cases. The power unit 230 may provide power to any or all of the powered components of the range determiner assembly 130. The range determiner assembly 130 may therefore be provided as a single unit that can be embodied in a mobile or fixed structure that can be carried or installed on the aircraft 110. As such, the range determiner assembly 130 may include a single housing inside which each of the other units, modules or components of FIG. 2 may be housed.

The image sensor 200 may be a camera or other such imaging device capable of capturing image data. In an example embodiment, the image sensor 200 may be a modular component that can be wholly or partially replaced with corresponding modules designed to support the tasks and/or missions for which the range determiner assembly 130 is configured to provide support. The image sensor 200 may be entirely passive, or may include an active transmitter and sensor for obtaining reflected returns from the target 100. In some cases, as mentioned above, the image sensor 200 may be capable of being outfitted with cameras of various types, sizes and/or capabilities. For example, 412 nm, 645 nm, 845 nm and various other cameras could be employed and, in some cases, the image sensor 200 may be configured for multispectral analysis.

As shown in FIG. 1, the image sensor 200 captures image data corresponding to the fore, nadir and aft views. In an example embodiment, the fore, nadir and aft views may each be separated by at least about fifteen or twenty degrees, and they may be captured by the same device (i.e., the image sensor 200). The captured data may be a series of images taken at a number of locations along the track of the aircraft 110 of the target 100. These images can be co-aligned for SRR and/or conventional multi-spectral observations in the visible/near infrared or longwave infrared determinations. The images may also be taken and processing accomplished relative to a plurality of different targets. Thus, for example, as the aircraft 110 moves along its track, data may be continuously gathered and the data may include a plurality of different targets with respect to which the data can be analyzed to determine ranging information. The analysis may be accomplished via the detector board 210.

The detector board 210 may include or otherwise be in communication with the processing circuitry 220 to enable the data captured to be co-aligned and processed as described herein. However, in accordance with an example embodiment, the detector board 210 may be a single unit that includes a first line array 212, a second line array 214, and a third line array 216. Each of the line arrays may be a CMOS linear array configured to facilitate processing of the sequences of image corresponding to respective ones of the fore, nadir and aft views.

As shown in FIG. 2, the image sensor 200 and the detector board 210 may include or otherwise be in communication with the processing circuitry 220 that is configurable to perform actions in accordance with example embodiments described herein. As such, for example, at least some of the functions attributable to the image sensor 200 and/or the detector board 210 may be carried out by or otherwise instructed by the processing circuitry 220. The processing circuitry 220 may provide the hardware that is programmed or that hosts software to configure the system for machine learning and/or machine driven analysis techniques consistent with example embodiments. In this regard, range determinations (e.g., based on the offset determinations discussed above in reference to FIG. 1) may therefore be accomplished using the processing circuitry 220.

In an exemplary embodiment, the processing circuitry 220 may be configured to perform data processing, control function execution and/or other processing and management services. In some embodiments, the processing circuitry 220 may be embodied as a chip or chip set. In other words, the processing circuitry 220 may comprise one or more physical packages (e.g., chips) including materials, components and/or wires on a structural assembly (e.g., a baseboard).

In an example embodiment, the processing circuitry 220 may include one or more instances of a processor 222 and memory 224 that may be in communication with or otherwise control a device interface 240 and, in some cases, a user interface 250. As such, the processing circuitry 220 may be embodied as a circuit chip (e.g., an integrated circuit chip) configured (e.g., with hardware, software or a combination of hardware and software) to perform operations described herein.

The user interface 250 (if implemented) may be in communication with the processing circuitry 220 (directly or via the device interface 240) to receive an indication of a user input at the user interface 250 and/or to provide an audible, visual, mechanical or other output to the user. As such, the user interface 250 may include, for example, a display, one or more buttons or keys (e.g., function buttons), and/or other input/output mechanisms (e.g., keyboard, microphone, speakers, cursor, joystick, lights and/or the like). The user interface 250 may display or otherwise provide an output of information indicating an identity or certain characteristics of a data set (e.g., including images or results of analyzing images). As such, for example, the user interface 250 may provide an output indicating cloud-top height, or any other relative distance for which the range determiner assembly 130 is employed to determine The data sets of the detector board 210 may therefore be processed and information associated therewith may be presented on a display of the user interface 250 based on instructions executed by the processing circuitry 220 for the analysis of the data according to prescribed methodologies and/or algorithms. Moreover, in some cases, the user interface 250 may include options for selection of one or more reports to be generated based on the analysis of a given data set. In an example embodiment, the range determiner assembly 130 may not include a user interface 250, or the user interface 250 may be external and may be mated with the range determiner assembly 130 via the device interface 240.

The device interface 240 (if employed) may include one or more interface mechanisms for enabling communication with the various internal and/or external devices of the range determiner assembly 130 and/or with which the range determiner assembly 130 communicates. In some cases, the device interface 240 may be any means such as a device or circuitry embodied in either hardware, or a combination of hardware and software that is configured to receive and/or transmit data from/to devices in communication with the processing circuitry 220. In some cases, the device interface 240 may include one or more ports for external component connectivity and/or communication. Standard ports such as USB, other data ports, or power cable ports may be provided. However, in some cases, the ports may be for proprietary connectivity mechanisms.

In an exemplary embodiment, the memory 224 may include one or more non-transitory memory devices such as, for example, volatile and/or non-volatile memory that may be either fixed or removable. The memory 224 may be configured to store information, data, applications, instructions or the like for enabling the range determiner assembly 130 to carry out various functions in accordance with exemplary embodiments. For example, the memory 224 could be configured to buffer input data for processing by the processor 222. Additionally or alternatively, the memory 224 could be configured to store instructions for execution by the processor 222. As yet another alternative, the memory 224 may include one or more databases that may store a variety of data sets indicative of features or characteristics of data that can be correlated to corresponding parameters. For example, data captured by the image sensor 200 may be calibrated against targets of known temperature. The temperature data may provide enhanced accuracy relative to weather services provided for the data gathered. Thus, in some cases, the memory 224 may store information associated with patterns, image data, feature vectors, histograms, processing algorithms and/or the like to be employed for the execution of example embodiments. Among the contents of the memory 224, applications may be stored for execution by the processor 22 in order to carry out the functionality associated with each respective application. In some cases, the applications may include directions for control of the range determiner assembly 130 to generate and/or employ analytical tools for analyzing image data to range, temperature or other parametric determinations as described herein. In some cases, the applications may further include directions for generating outputs and/or reports associated with analysis of image data as described herein.

The processor 222 may be embodied in a number of different ways. For example, the processor 222 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 222 may be configured to execute instructions stored in the memory 224 or otherwise accessible to the processor 222. As such, whether configured by hardware or by a combination of hardware and software, in some embodiments the processor 222 may represent an entity (e.g., physically embodied in circuitry—in the form of processing circuitry 220) capable of performing operations while configured accordingly. Thus, for example, when the processor 222 is embodied as an ASIC, FPGA or the like, the processor 222 may be specifically configured hardware for conducting the operations described herein. Alternatively, as another example, when the processor 222 is embodied as an executor of software instructions, the instructions may specifically configure the processor 222 to perform the operations described herein.

In an example embodiment, the processor 222 (or the processing circuitry 220) may be embodied as, include or otherwise control the range determiner assembly 130 (or components thereof). As such, in some embodiments, the processor 222 (or the processing circuitry 220) may be said to cause each of the operations described in connection with the range determiner assembly 130 (or components thereof) by directing the range determiner assembly 130 (or respective components) to undertake the corresponding functionalities responsive to execution of instructions or algorithms configuring the processor 222 (or processing circuitry 220) accordingly.

In an example embodiment, data captured in association with image scanning of the target 100 may be stored (e.g., in the linear arrays of the detector board 210) for co-alignment and range determinations based on the offsets calculated by employing parallax effect-based determinations in the manner described in reference to FIG. 1. In some cases, other data such as temperature, pressure and/or the like, may also be integrated via the detector board 210 and/or the processing circuitry 220 to make various corrections to range determinations and/or other useful weather related parameters. It may also be possible to estimate the height of the cloud base by employing the same technique to the top and bottom of individual cloud elements for non-overcast conditions. However, it should be appreciated that the techniques described herein are also useful in other contexts beyond weather related use cases. Surveying, surveillance, and other operational use cases are also supported.

In an example embodiment, the range determiner assembly 130 may therefore be any means such as a device or circuitry embodied in either hardware, or a combination of hardware and software that is configured to perform the corresponding functions of the range determiner assembly 130 as described herein under the control of the processing circuitry 220. In an example embodiment, the range determiner assembly 130 may be configured to perform various actions associated with managing the gathering of at least three different series of images corresponding to three different views obtained by a single imaging device (e.g., camera). As such, the range determiner assembly 130 represents a low cost and simple platform on the one hand. However, the range determiner assembly 130 does not sacrifice performance by virtue of its low cost and simplicity. Instead, and to the contrary, the provision of the components of the range determiner assembly 130 in a single housing, while also employing a single camera and detector board actually improve performance in some ways. In this regard, a primary difficulty for applying SRR conventionally is that it is difficult to identify the same cloud (or target 100) in an image with multiple clouds or targets. When attempting to identify the target 100 based on correlations in reflectivity or radiance among different cloud elements with different views from different cameras or sensors, the difficulty is enhanced. However, by capturing all image data with the same camera assembly (rather than multiple cameras and/or multiple air/space crafts), higher correlations are possible for identical cloud elements viewed from different angles, and simpler image processing techniques can be employed. Accordingly, the range determiner assembly 130 represents a more practical and accurate implementation platform than conventional platforms.

Of note, multiple cameras can be used. However, the multiple camera use cases generally employ the multiple cameras for multispectral analysis and not in order to obtain the different views that are correlated together. As such, a first camera may operate at a first wavelength, a second camera may operate at a second wavelength, and a third camera may operate at a third wavelength, and data associated with each respective different wavelength can correspondingly be processed by each of the respective line arrays. Various different filters may be applied to equip the cameras accordingly. In an example embodiment, two of the wavelengths may be visible wavelengths and the third may be near infrared, but other configurations are possible. If an IR camera is employed, cloud temperature may also be measured to provide a further indicator of cloud height. Thus, temperature data may be combined with the range data determined via image analysis to determine a composite range (based on image analysis and at least one other parameter—such as temperature, in this case). Thus, an independent range analysis can be accomplished via image analysis and then another height indicator source (e.g., temperature data) may be used to supplement the independent indicator source.

Figure 3:
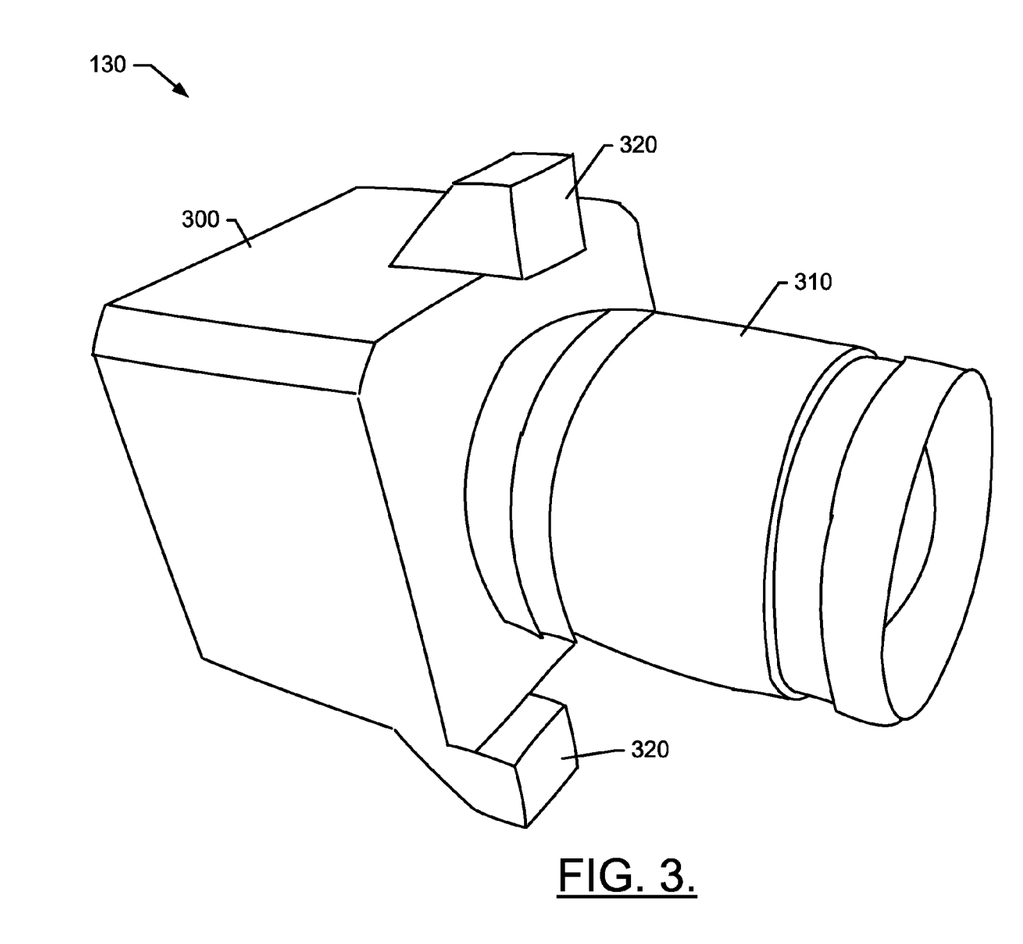
FIG. 3 illustrates a perspective view of a range determiner assembly in accordance with an example embodiment.

Example embodiments may therefore employ a single camera to obtain three views of an object (or target) at each of a plurality of positions to form three distinct image sequences that can be fed into respective line arrays. Each image sequence represents a series of images that when correlated with each other provide difference perspective views of one or more targets taken at the same time. After this data is captured at each of the plurality of positions (e.g., at least 3), parallax effect can be used to determine angular differences to the target 100 in order to calculate a position of the target 100 relative to the viewing platform (e.g., the aircraft 110). Thereafter, if the position of the viewing platform can be accurately known or determined (e.g., by GPS or altimeter), then the height of the target 100 can be accurately determined FIG. 3 illustrates a perspective view of the range determiner assembly 130 in accordance with an example embodiment. As shown in FIG. 3, the range determiner assembly 130 may include a housing 300 for containing the components of the range determiner assembly 130. A lens element 310 may be provided as a portion of the image sensor 200 to capture image data that can be fed to the line arrays of the detector board 210, which is housed inside the housing 300 along with other components of the range determiner assembly 130. In some embodiments, the housing 300 may be radiation hardened for space applications. In some cases, one or more mounting brackets 320 may also be provided on the housing 300 to enable the housing 300 to be mounted to the aircraft 110. The housing 300 may include one or more ports (e.g., associated with the device interface 240) to provide connectivity to/from components inside the housing 300. In some cases, the ports may include interfaces to external devices such as, for example, thermocouples or pressure gauges for measuring temperature or pressure.

Figure 4:
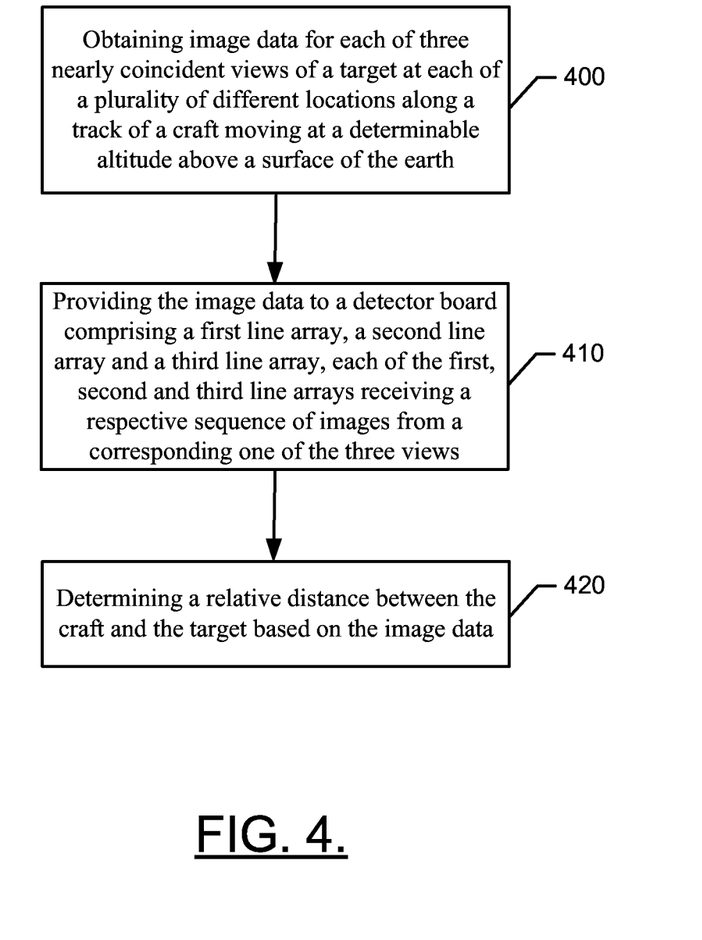
FIG. 4 illustrates a block diagram of a method of determining range in accordance with an example embodiment.

As may be appreciated from the descriptions herein, some example embodiments may be practiced using an apparatus such as the one described in reference to FIGS. 1-3. However, it should also be appreciated that some embodiments (or aspects thereof) may be practiced in connection with a method and/or computer program product. FIG. 4 illustrates a block diagram of a method of determining range in accordance with an example embodiment. As such, for example, each block or step of the flowchart of FIG. 4, and combinations of blocks in the flowcharts, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 224) and executed by processing circuitry 220 (e.g., via processor 222).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

As shown in FIG. 4, a method for determining range in accordance with an example embodiment may include obtaining image data for each of three views of a target at each of a plurality of different locations along a track of a craft moving at a determinable altitude above a surface of the earth at operation 400. The image data may be obtained nearly simultaneously or coincidently at three different angles to provide three near-coincident views. The method may further include providing the image data to a detector board comprising a first line array, a second line array and a third line array at operation 410. Each of the first, second and third line arrays may receive a respective sequence of images from a corresponding one of the three views. The method may further include determining a relative distance between the craft and the target based on the image data at operation 420.

In some cases, the operations 400-420 may also be modified, augmented or amplified in some cases. For example, in some embodiments, the first, second and third views may correspond to fore, nadir and aft views, respectively. Each of the first, second and third views may be simultaneously captured via a single lens element. In an example embodiment, the fore, nadir and aft views may be separated by about 15 to 20 degrees or more whenever possible. For example, separation of about 30 degrees may be obtained in some situations. In some cases, each of the first, second and third linear arrays may be embodied as a CMOS linear array. In some embodiments, determining the relative distance may include determining an independent range estimate, and modifying the independent range estimate based on at least one other parameter (e.g., temperature) to determine a composite range. In an example embodiment, simultaneously or nearly coincidently obtaining image data for each of the three views of the target may include obtaining a plurality of sets of image data from respective different cameras configured for multispectral analysis. In this regard, each of the cameras may be configured to operate at respective different frequencies to capture a corresponding different sequence of images. In some cases, determining the relative distance may include determining cloud-top height based on the relative distance and altitude of the craft.

In an example embodiment, an apparatus for performing the method of FIG. 4 above may comprise a processor (e.g., the processor 222) configured to perform some or each of the operations (400-420) described above. The processor 222 may, for example, be configured to perform the operations (400-420) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 400-420 may comprise, for example, the processing circuitry 220.

Many modifications and other embodiments of the inventions set forth and claimed herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A range determiner assembly comprising:
an image sensor configured to obtain image data for each of a plurality of views of a target captured at each of a plurality of different locations of the range determiner assembly moving in relation to the target at a determinable altitude above a surface;
a detector board comprising at least a first line array, a second line array and a third line array, each of the at least first, second and third line arrays receiving a respective sequence of image data for a corresponding one of the plurality of views; and
processing circuitry configured to:
determine the locations of the range determiner assembly when the image data is captured;
determine angular differences to the target at each of the locations; and
determine a relative distance between the range determiner assembly and the target based on the image data, the locations of the ranger determiner assembly when the image data is captured, and the angular differences to the target at each of the locations.

2. The range determiner assembly of claim 1, wherein the plurality of views correspond to fore, nadir and aft views, respectively, each of which is captured via a single lens element; and
wherein the plurality of views are co-aligned based on an angular separation.

3. The range determiner assembly of claim 2, wherein the fore, nadir and aft views are separated by about 15 to 20 degrees.

4. The range determiner assembly of claim 1, further comprising a housing that houses each of the image sensor, the detector board and the processing circuitry.

5. The range determiner assembly of claim 4, wherein the housing is radiation hardened.

6. The range determiner assembly of claim 1, wherein each of the at least first, second and third line arrays comprises a CMOS linear array.

7. The range determiner assembly of claim 1, wherein the processing circuitry is further configured to:
obtain additional height indicator source data; and
determine a composite range based on the relative distance and the additional height indicator source data.

8. The range determiner assembly of claim 7, wherein the additional height indicator data is data associated with a weather related parameter.

9. The range determiner assembly of claim 8, wherein the data associated with a weather related parameter is temperature data.

10. The range determiner assembly of claim 1, wherein the range determiner assembly is configured for multispectral analysis to determine the relative distance.

11. The range determiner assembly of claim 10, wherein the image sensor comprises a plurality of cameras configured to operate at respective different frequencies, each of the cameras capturing a corresponding different sequence of images.

12. The range determiner assembly of claim 1, wherein the range determiner assembly is mounted or operably coupled to a craft comprising an aircraft, drone, or satellite.

13. The range determiner assembly of claim 1, wherein the target is a cloud and the relative distance is used along with altitude of the range determiner assembly to determine cloud-top height.

14. A method of determining range to a target, the method comprising:
obtaining, at a craft, image data of the target at three different angles to provide three near-coincident views of the target captured at each of a plurality of different locations along a track of the craft moving at a determinable altitude above a surface of the earth;

providing the image data to a detector board comprising a first line array, a second line array and a third line array, each of the first, second and third line arrays receiving a respective sequence of image data for a corresponding one of the three views;

determining the locations of the craft when the image data is captured;

determining angular differences to the target at each of the locations; and determining a relative distance between the craft and the target based on the image data, the locations of the craft when the image data is captured, and the angular differences to the target at each of the locations.

15. The method of claim 14, wherein the first, second and third views correspond to fore, nadir and aft views respectively, each of which is captured via a single lens element.

16. The method of claim 15, wherein the fore, nadir and aft views are separated by at least about 15 to 20 degrees.

17. The method of claim 14, wherein each of the first, second and third line arrays comprises a CMOS linear array.

18. The method of claim 14, further comprising:
obtaining additional indicator height source data; and
determining a composite range based on the relative distance and the additional height indicator source data.

19. The method of claim 14, wherein obtaining image data for each of the three views of the target comprises obtaining a plurality of sets of image data from respective different cameras configured for multispectral analysis.

20. The method of claim 14, wherein determining the relative distance comprises determining cloud-top height based on the relative distance and altitude of the craft.

* * * * *